(12) United States Patent
Genderjahn et al.

(10) Patent No.: US 9,608,503 B2
(45) Date of Patent: Mar. 28, 2017

(54) ACTUATOR FOR DAMPING LOW-FREQUENCY OSCILLATIONS

(71) Applicant: ContiTech Vibration Control GmbH, Hannover (DE)

(72) Inventors: Robert Genderjahn, Hannover (DE); Bernhard Uhrmeister, Hannover (DE); Hans-Juergen Karkosch, Hemmingen (DE); Peter Marienfeld, Marklohe (DE)

(73) Assignee: ContiTech Vibration Control GmbH, Hannover (DE)

( * ) Notice: Subject to any disclaimer, the term of this patent is extended or adjusted under 35 U.S.C. 154(b) by 274 days.

(21) Appl. No.: 14/505,397

(22) Filed: Oct. 2, 2014

(65) Prior Publication Data

US 2015/0015091 A1 Jan. 15, 2015

Related U.S. Application Data

(63) Continuation of application No. PCT/EP2013/053234, filed on Feb. 19, 2013.

(30) Foreign Application Priority Data

Apr. 2, 2012 (DE) .................. 10 2012 102 833

(51) Int. Cl.
*H02K 33/18* (2006.01)
*H01F 7/00* (2006.01)
(Continued)

(52) U.S. Cl.
CPC ............. *H02K 33/18* (2013.01); *H01F 7/066* (2013.01); *H02K 7/08* (2013.01)

(58) Field of Classification Search
CPC . H02K 33/18; H01F 7/006; H01F 7/11; H01F 7/122; H01F 7/13
(Continued)

(56) References Cited

U.S. PATENT DOCUMENTS

| 6,476,702 | B1 | 11/2002 | Hartwig et al. |
| 2003/0114999 | A1* | 6/2003 | Shimoda ................ H02K 33/16 702/56 |

(Continued)

OTHER PUBLICATIONS

International Search Report dated Jul. 24, 2014 of international application PCT/EP2013/053234 on which this application is based.

*Primary Examiner* — Michael Andrews
(74) *Attorney, Agent, or Firm* — Walter Ottesen, P.A.

(57) ABSTRACT

An actuator has an electrically conductive coil which has a longitudinal axis and windings through which a current can flow. The coil is surrounded by a highly permeable first ferromagnetic body so that the first body has projections of highly permeable ferromagnetic material above and below the coil in the longitudinal direction. The actuator has a magnet spaced apart from the coil so that a gap forms therebetween. The magnet is surrounded by a highly permeable second ferromagnetic body so that the second body has projections of highly permeable ferromagnetic material above and below the magnet in the longitudinal direction. The magnet is statically mounted with the second body and the coil is spring mounted with the first body so that the coil and first body oscillate in the longitudinal direction when an alternating current flows through the coil. The coil is outside the magnet perpendicular to the longitudinal axis.

10 Claims, 4 Drawing Sheets

(51) Int. Cl.
*H01F 7/06* (2006.01)
*H02K 7/08* (2006.01)

(58) Field of Classification Search
USPC .................................................. 310/15–39
See application file for complete search history.

(56) References Cited

U.S. PATENT DOCUMENTS

| | | | |
|---|---|---|---|
| 2011/0050008 A1* | 3/2011 | Chang | H02K 33/16 |
| | | | 310/25 |
| 2011/0133488 A1* | 6/2011 | Roberts | H02K 35/02 |
| | | | 310/25 |
| 2013/0127175 A1 | 5/2013 | Zuo et al. | |
| 2014/0184369 A1* | 7/2014 | Genderjahn | H02K 33/18 |
| | | | 335/220 |

* cited by examiner

ACTUATOR FOR DAMPING LOW-FREQUENCY OSCILLATIONS

CROSS REFERENCE TO RELATED APPLICATIONS

This application is a continuation application of international patent application PCT/EP2013/053234, filed Feb. 19, 2013, designating the United States and claiming priority from German application 10 2012 102 833.8, filed Apr. 2, 2012, and the entire content of both applications is incorporated herein by reference.

BACKGROUND OF THE INVENTION

Actuators of this kind are known, for example, from U.S. Pat. No. 6,476,702. The actuators contain a mass-spring system which can oscillate and which is made to oscillate when an alternating current is driven through the electrically conductive coil. The actuators are used for an extremely wide variety of purposes, for example as linear electromagnetic actuators (linear motors) in pumps, as oscillation generators or as oscillation absorbers. In the last-mentioned case, an actuator of the kind described in the introductory part is mechanically operatively connected to an oscillating component and oscillations are generated in the actuator, these oscillations being superimposed on the oscillations of the component. Given suitable selection of amplitude, frequency and phase of the oscillations which are generated in the actuator, the oscillations of the component are reduced or absorbed.

In the simplest case, the abovementioned linear electromagnetic actuator includes only two parts, specifically a coil which is wound around a core and a magnet which is embedded in a ferromagnetic casing, wherein one of the two constituent parts of the actuator is mounted in a sprung manner in relation to the other stationary constituent part. Despite this simple construction, high excitation forces can be generated within the actuator since, in addition to the electrodynamic forces which are created when an alternating current is driven through the electrically conductive coil, rectified magnetic reluctance forces also have an effect in the actuator. To this end, collar-like projections are provided on the core of the coil and on the casing of the magnet in such a way that the magnetic flux across these projections is shut off via the air gap which is located between the projections, and the reluctance forces act at these locations.

In linear electromagnetic actuators of this kind, the transmission behavior of the system, as a matter of principle owing to the design of the actuator as an oscillating mass-spring system, inter alia has a resonant peak at the first natural frequency $f_e$ (resonant frequency) of the system. This is dependent on the stiffness of the mass suspension means and the size of the moving mass. The oscillating mass "builds up" in an undesired manner when "passing through" this resonant frequency $f_e$ or in the region of the resonant frequency $f_e$. This may result in very poor control properties and also, under certain circumstances, in the oscillating mass loudly striking the actuator housing. This currently leads to a restriction in the frequency operating range of the actuator system because the operating range of the actuator is shifted toward relatively high frequencies in order to not excite the resonant frequency $f_e$ during operation. The (expedient) minimum of the first natural frequency $f_e$ of a linear electromagnetic actuator for damping oscillations in a motor vehicle is typically between approximately 40 and 60 Hz, depending on the design and configuration.

However, for a typical application, in a vehicle, of an actuator of this kind, for example as an active oscillation absorber, effectiveness at a low frequency, for example in the idling range of the vehicle, is desirable and, sometimes, also required. Consequently, there is a need to set the first natural frequency $f_e$ of the actuator below the idling frequency of the vehicle motor.

The resonant frequency $f_e$ of a simple mass-spring system can be reduced by means of reducing the spring stiffness and/or by means of increasing the oscillating mass. Since the spring system used in the linear electromagnetic actuator also has to compensate for the magnetic transverse stiffness between the coil and the magnet, a further reduction in the spring stiffness is not possible or only possible to a very slight extent. Therefore, it is necessary to make the adjustment by means of increasing the size of the oscillating masses. However, increasing the oscillating mass in the linear electromagnetic actuator also entails an increase in the total weight and a considerable increase in the size of the installation space.

Reduction of the lower natural frequency $f_e$ below, for example, the idling range of the vehicle motor also results in the problem of increased excitation of this low-frequency resonance $f_e$ due to, for example, carriageway unevennesses.

Irrespective of this, it is desirable in mass-spring systems of this kind to damp the resonant deflections. In this case, the actuator can be operated in a relatively large frequency range and also in the resonant range when the resonant peak in the transmission function is damped to a sufficient degree.

SUMMARY OF THE INVENTION

It is an object of the invention to provide an actuator of the kind described above, of which the first (lowest) natural frequency $f_e$ is reduced compared to known actuators of this kind. Furthermore, damping of the actuator is intended to be increased.

The actuator of the invention includes: an electrically conductive coil defining a longitudinal axis (L) and having a plurality (n) of winding turns configured to have an electrical current flow therethrough; a first ferromagnetic body of high permeability surrounding the electrically conductive coil in such a manner that the first ferromagnetic body has collar-like projections of ferromagnetic material of high permeability above and below the electrically conductive coil in the direction of the longitudinal axis (L); at least one magnet spaced substantially perpendicularly from the winding turns with respect to the longitudinal axis (L) so as to cause the coil and the magnet to conjointly define an air gap therebetween; a second ferromagnetic body of high permeability surrounding the magnet such that the second ferromagnetic body has collar-like projections of ferromagnetic material of high permeability above and below the magnet in the direction of the longitudinal axis (L); the magnet having a side facing away from the air gap; the electrically conducting coil having a side facing away from the air gap; the first ferromagnetic body being disposed on the side of the electrically conductive coil facing away from the air gap; the second ferromagnetic body being disposed on the side of the magnet facing away from the air gap; the magnet being statically mounted together with the second ferromagnetic body; the electrically conductive coil being spring mounted together with the first ferromagnetic body so as to enable the electrically conductive coil together with the first ferromagnetic body to oscillate in the direction of the longitudinal axis (L) when an alternating current is flowing through the electrically conductive coil; and, the electrically conductive coil being arranged outside of the magnet perpendicularly with respect to the longitudinal axis (L).

The present invention therefore relates to an actuator in which the coil is arranged outside the at least one magnet perpendicular to the longitudinal axis L.

The present invention is based on the finding that the coil of a linear electromagnetic actuator, together with the ferromagnetic body, possibly also together with the actuator housing, constitutes a greater mass than the magnet or the magnets together with the ferromagnetic bodies of the magnet or magnets. Therefore, according to the invention, the manner of operation of the linear motor is inverted, that is, a changeover is made between the moving mass and the rigid mass. The inner armature, that is, the magnet with the second ferromagnetic body which has only a relatively low mass, is therefore stationary according to the invention and the outer actuator part, which has a very large mass, that is, the coil with the first ferromagnetic body and the housing of the actuator, is mounted such that it can oscillate.

This clearly increases the oscillating mass without changing the total weight, and accordingly, as desired, also reduces the first natural frequency of the actuator by increasing the oscillating mass. At the same time, the installation space for the actuator is not changed or is changed only insignificantly, this being specifically an important criterion for the use of a system of this kind in the case of applications in vehicles.

In this case, it is also advantageous for an increase in the size of the frequency operating range of the actuator overall to be achieved, for example over the entire rotation speed range from idling up to high rotation speeds, with only one actuator design.

It is further advantageous that the oscillating mass can be varied in a very simple manner by selecting the mass of the actuator housing, that is, the oscillating mass can be varied without changing the design of the coil and of the corresponding ferromagnetic body. As a result, actuators with different oscillating masses can be provided, without having to change the oscillation-generating components of the actuator. This allows for a large variance in the actuators with a low level of expenditure on the actuator for modification purposes, this reducing the costs of manufacture of the various actuators.

According to one aspect of the invention, in the static state of the actuator, the at least one magnet projects beyond the ends of the coil as seen in the longitudinal direction L of the coil.

It is advantageous in this case that, owing to the greater length of the magnet in the longitudinal direction L compared to the shorter length of the coil in the longitudinal direction L, the collar-like projections of the coil and of the magnet also always partially overlap in the longitudinal direction L in the event of a relative oscillation between the coil and magnet over a certain oscillation movement. In this way, a linear operating behavior of the actuator is also achieved in the case of oscillations within this movement range.

According to a further aspect of the invention, the actuator has a cylindrical coil which is provided around a cylindrical magnet in the radial direction R with respect to the longitudinal axis L.

It is advantageous in this case that the actuator has a rotationally symmetrical configuration in relation to the longitudinal direction L of the coil and only an annular air gap between the magnet and the coil, so that the overall volume of the actuator can be utilized to an optimum extent. Furthermore, all of the magnetic forces which act in the radial direction R cancel each other out. Furthermore, the actuator has a largely linear operating behavior given appropriate mounting of the magnet or of the coil, since the width of the air gap between the magnet and the coil then does not change.

According to a further aspect of the invention, the coil is surrounded at least in regions by an actuator housing. The actuator has a connecting element for connecting the at least one magnet or second ferromagnetic body to a structure into which oscillation is intended to be introduced by the actuator. The connecting element is provided through an opening in the actuator housing.

The armature can advantageously be rigidly mounted at one point of the structure, for example of a vehicle body, by means of an additional connecting element. To this end, only one opening is required in the actuator housing. The advantage of a configuration of this kind is seen in the uncomplicated implementation, that is, the previous actuator configuration and the fundamental manner of operation, as described in U.S. Pat. No. 6,476,702 for example, remains unchanged. It is only necessary to provide the additional connecting element through the opening, which is to be created, in the actuator housing, and to fasten the actuator to the structure via the additional connecting element.

According to a further aspect of the invention, at least one elastomeric body is provided between the connecting element or the structure and the actuator housing in such a way that the at least one elastomeric body can absorb transverse forces in the radial direction R and has a damping effect in the longitudinal direction L when the coil oscillates.

This advantageous embodiment of the actuator according to the invention is based on the finding that the diaphragm springs, helical springs or leaf springs which have customarily been used in linear actuators to date can be dispensed with when the task of absorbing the transverse forces in the radial direction R is assumed by an elastomeric guide. In this way, metal springs which are costly and have a limited service life can be dispensed with. At the same time, the installation space required for the actuator can be considerably reduced since the elastomeric body or bodies can be provided in a flexible manner between the actuator housing and the connecting element.

Furthermore, the oscillations in the longitudinal direction L can be damped at the same time via the elastomeric guide elements, this damping possibly being extremely useful particularly for control in the resonance range. Therefore, via an actuator which is damped in this way, the actuator can also be operated by means of suitable control in the resonance range, and this would also not be possible or would be possible only to an inadequate extent in the case of control without sufficient damping.

In addition, a stop function for limiting the maximum oscillating movement of the moving actuator part can be realized via the elastomeric bodies. As a result, no additional damping elements, which generate costs owing to the elements themselves and also owing to the expenditure on mounting the elements, are required for this purpose.

According to a further aspect of the invention, the connecting element surrounds the actuator housing at least in regions in the longitudinal direction L. The at least one elastomeric body is provided between the connecting element and the actuator housing in the radial direction R.

This arrangement is advantageous because the actuator can be configured in a very compact manner, that is, installation space can be saved.

According to a further aspect of the invention, a ball guide or sliding guide is provided between the connecting element and the actuator housing in the region of the opening in the actuator housing in such a way that the ball guide or sliding guide can guide the coil in the longitudinal direction L.

In this advantageous embodiment of the actuator according to the invention, the metal springs, such as diaphragm springs, helical springs or leaf springs for example, which are costly and have a limited service life, can be dispensed with since the task of absorbing the transverse forces is also assumed by the sliding or ball guide. However, the ball guide or sliding guide can also be used together with metal springs which then primarily absorb the transverse forces in the radial direction R.

According to a further aspect of the invention, the connecting element surrounds the actuator housing at least in regions in the longitudinal direction L, and at least one ball guide or sliding guide is provided between the connecting element and the actuator housing in the radial direction R in such a way that the ball guide or sliding guide can guide in the longitudinal direction L.

This embodiment is advantageous because, in this case too, a sliding guide or a ball guide can be used, and at the same time compact construction of the actuator is possible.

According to a further aspect of the invention, a supporting spring is provided between the actuator housing and the structure in such a way that the supporting spring has a damping effect in the longitudinal direction L when the coil oscillates.

In this advantageous embodiment of the actuator according to the invention, damping can also be achieved in the longitudinal direction L, the damping advantageously having an effect on the control of the actuator system, in particular in the region of the resonant frequency $f_e$. Furthermore, the metal springs, such as diaphragm springs, helical springs or leaf springs for example, which are costly and have a limited service life, can be dispensed with since the task of absorbing the transverse forces is also assumed by the supporting spring. A supporting spring of this kind can be provided in a manner comprising, for example, a metal/rubber combination. However, the supporting spring can also be used together with metal springs, which then primarily absorb the transverse forces in the radial direction R.

BRIEF DESCRIPTION OF THE DRAWINGS

The invention will now be described with reference to the drawings wherein.

DESCRIPTION OF THE PREFERRED EMBODIMENTS OF THE INVENTION

All of the embodiments in FIGS. 1 to 5 can be configured as cylindrical actuators 1 with corresponding cylindrical stationary parts 20 and parts 30 which can oscillate, the longitudinal axis L of the parts representing the axis of rotational symmetry of the actuator 1; this situation is described below with reference to FIGS. 1 to 5. However, all of the embodiments can also be configured as actuators 1 of plate-like design, in which the longitudinal axis L represents the plane of symmetry.

Figure 1:
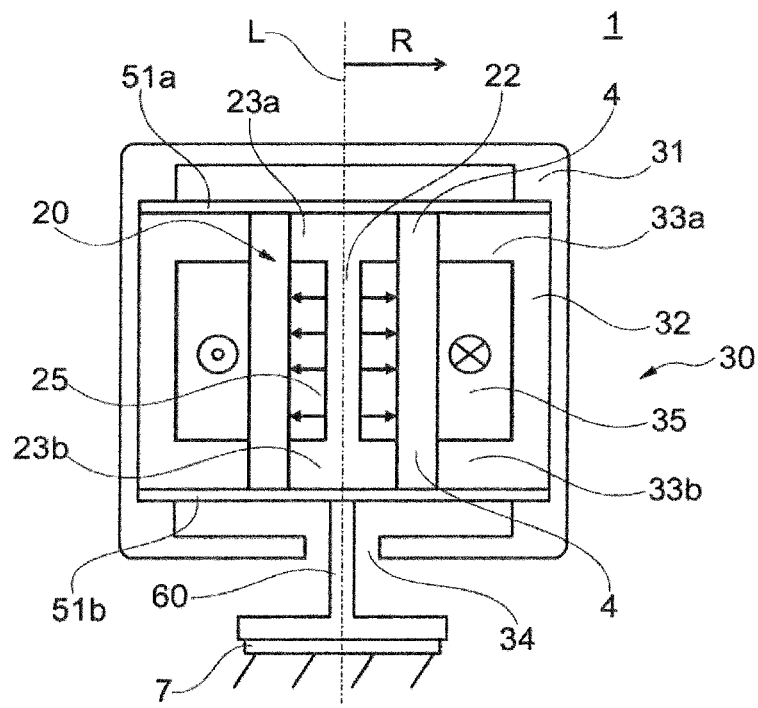
FIG. 1 is a schematic of an actuator according to the invention in a first embodiment.

FIG. 1 is a schematic of an actuator 1 according to the invention in a first embodiment. The actuator 1 is a linear electromagnetic actuator 1 (linear actuator, linear motor) having a mass-spring system which can oscillate. The actuator 1 has an outer part 30 which can oscillate and which is provided around an inner stationary part 20 perpendicular to the longitudinal axis L of the actuator 1. The longitudinal axis L of the actuator at the same time forms the longitudinal axis L of the outer part 30 which can oscillate and also of the inner stationary part 20 and also represents the oscillation axis of the actuator 1.

The stationary part 20 of the actuator 1 is fixedly connected to a structure 7, into which an oscillation is intended to be introduced by the actuator 1, such as a vehicle body 7 for example, via a connecting element 60, so that oscillations of the part 30, which can oscillate, of the actuator 1 can be transmitted to the structure 7. To this end, the stationary part 20 and the part 30 which can oscillate are connected to one another, such that they can oscillate, via spring-action elements (51a, 51b), such as metal springs, preferably diaphragm springs, helical springs or leaf springs, for example.

The part 30 which can oscillate has a coil 35 which has a plurality (n) of turns. The coil 35 is surrounded by a first ferromagnetic body 32 of high permeability. In this case, the first ferromagnetic body 32 has collar-like projections (33a, 33b) both above and below the coil 35 in the direction of the longitudinal axis L, the projections each extending perpendicular to the longitudinal axis L, that is, in the radial direction R, in the direction of the longitudinal axis.

The part 30 which can oscillate furthermore has an actuator housing 31 which surrounds the coil 35 and the first ferromagnetic body 32 in the radial direction R toward the outside and also in the direction of the longitudinal axis L away from the structure 7, and therefore largely closes off the interior of the actuator 1 from the surrounding area. In this case, the actuator housing 31 has an opening 34 which is oriented toward the structure 7.

The stationary part 20 has a magnet 25 which is a permanent magnet 25. The magnet 25 is surrounded by a second ferromagnetic body 22 which likewise has collar-like projections (23a, 23b) which extend both above and below the magnet 25 in the direction of the longitudinal axis L, in each case away from the longitudinal axis in the radial direction R.

An air gap 4 is formed between the magnet 25 and also the second ferromagnetic body 22 and the coil 35 and the first ferromagnetic body 32 in the radial direction R, the magnetic flux between the collar-like projections (23a, 23b, 33a, 33b) of the two ferromagnetic bodies (22, 32) being shut off via the air gap when an electric current flows through the turns of the coil 35. This then generates an oscillation in the longitudinal direction L if an alternating current is applied.

According to the invention, the first natural frequency $f_e$ of this oscillation is now reduced in comparison to known linear actuators 1 since the mass of the part 30 which can oscillate, in particular on account of the weight of the coil 35 together with the first ferromagnetic body 32 and the actuator housing 31, is considerably greater than the weight of the magnet 25 together with the second ferromagnetic body 22 which is usually arranged in the part 30, which can oscillate, of the known linear actuators 1.

Figure 2:
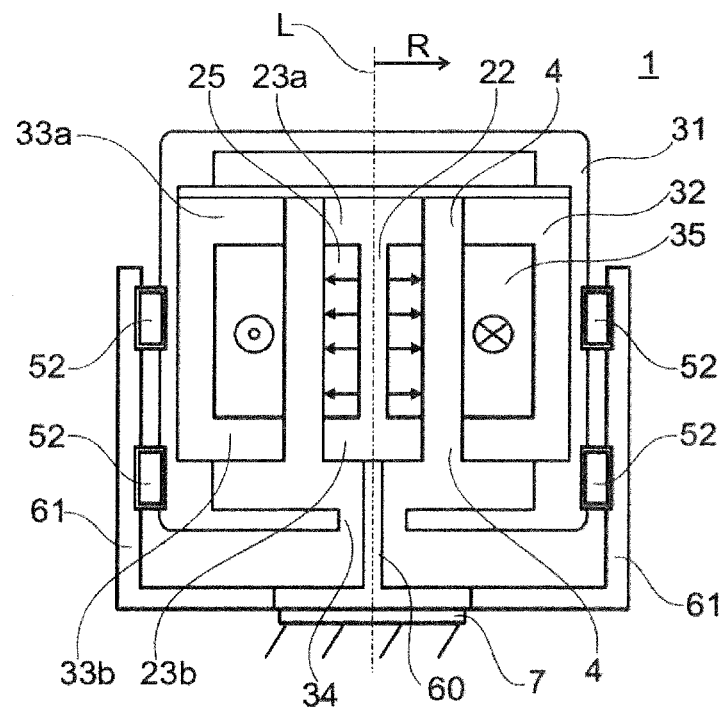
FIG. 2 is a schematic of an actuator according to the invention in a second embodiment.

FIG. 2 shows a schematic of an actuator 1 according to the invention in a second embodiment. In contrast to the first embodiment of FIG. 1, the spring-action elements (51a, 51b) for connecting the part 30, which can oscillate, to the stationary part 20 in an oscillating manner are dispensed with in this case since the metal springs which have been used for this purpose to date are expensive and have a limited service life. Instead, the connecting element 60 is configured such that it has a lateral projection 61, which surrounds the actuator housing 31 in the circumferential direction, in the direction of the longitudinal axis L. At least one elastomeric body 52 is provided between the projection 61 and the actuator housing 31 in the radial direction R, it being possible for the elastomeric body to absorb the transverse forces of the oscillation in the radial direction R, as the spring-action elements (51a, 51b) have to date. Furthermore, the elastomeric body or bodies 52 can have a damping effect in the longitudinal direction L, as a result of which specifically the resonant peak of the oscillation in the region of the natural frequency $f_e$ is reduced and the control behavior of the actuator 1 is positively influenced.

Figure 3:
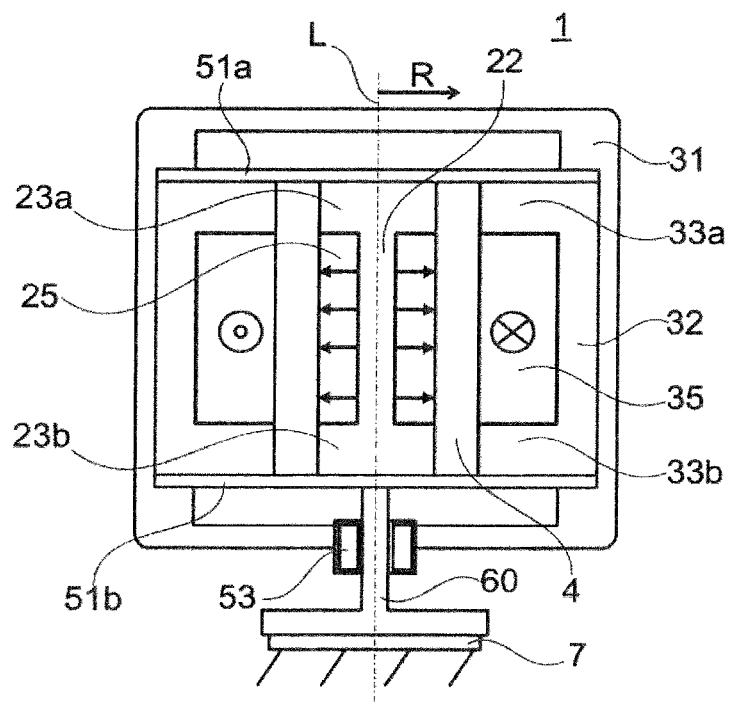
FIG. 3 is a schematic of an actuator according to the invention in a third embodiment.

FIG. 3 shows a schematic of an actuator 1 according to the invention in a third embodiment. In this case, guiding in the longitudinal direction L between the part 30 which can oscillate and the stationary part 20 is realized by a sliding guide 53 or a ball guide 53 which is provided in the opening 34 between the actuator housing 31 and the connecting element 60. In this case, the sliding guide 53 or ball guide 53 can be provided as an alternative or in addition to the spring-action elements (51a, 51b) which then primarily absorb the transverse forces in the radial direction R, this otherwise likewise being assumed by the sliding guide 53 or ball guide 53; FIG. 3 shows the combination of spring-action elements (51a, 51b) with a sliding guide 53 or ball guide 53.

Figure 4:
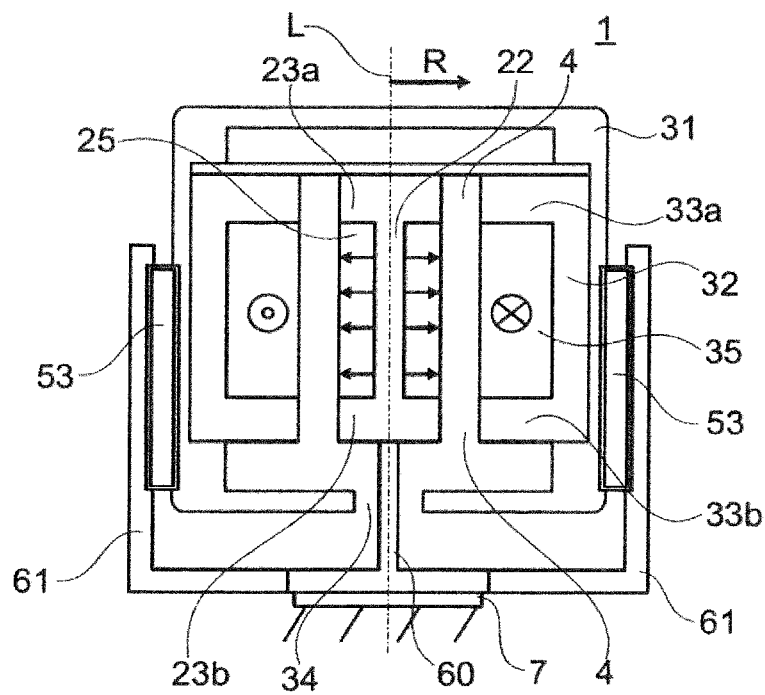
FIG. 4 is a schematic of an actuator according to the invention in a fourth embodiment.

FIG. 4 shows a schematic of an actuator 1 according to the invention in a fourth embodiment. In this case, a sliding guide 53 or ball guide 53 is arranged between the actuator housing 31 and the lateral projection 61 of the connecting element 60.

Figure 5:
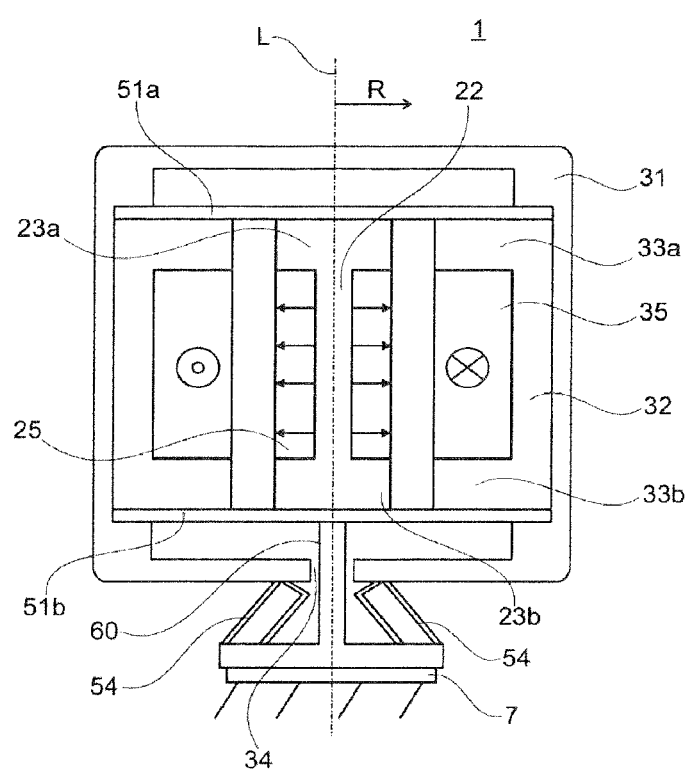
FIG. 5 is a schematic of an actuator according to the invention in a fifth embodiment; and, FIG. 6 is a schematic of an actuator according to the invention in a sixth embodiment.

FIG. 5 shows a schematic of an actuator 1 according to the invention in a fifth embodiment. Here, damping of the resonant peak and guiding in the longitudinal direction L between the part 30 which can oscillate and the stationary part 20 is realized by a supporting spring 54, preferably including a rubber/metal combination, which is provided between the actuator housing 31 and the structure 7. In this case too, the supporting spring 54 can be provided as an alternative or in addition to the spring-action elements (51a, 51b) which then primarily absorb the transverse forces in the radial direction R, this otherwise likewise being assumed by the supporting spring 54; FIG. 4 shows the combination of spring-action elements (51a, 51b) with a supporting spring 54.

Figure 6:
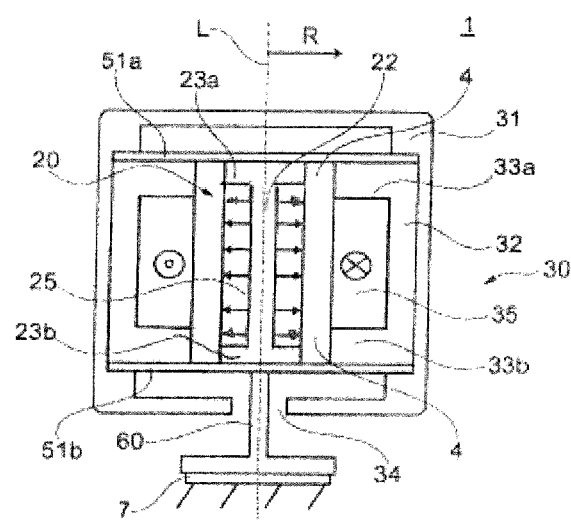

FIG. 6 shows a schematic of an actuator 1 according to a sixth embodiment. Here, the actuator is in the static state and the at least one magnet 25 projects beyond the ends of the coil 35 as seen in the longitudinal direction L of the coil.

It is understood that the foregoing description is that of the preferred embodiments of the invention and that various changes and modifications may be made thereto without departing from the spirit and scope of the invention as defined in the appended claims.

LIST OF REFERENCE SYMBOLS

Part of the Description

L Longitudinal axis, oscillation axis of the actuator 1
R Radius of the actuator 1, perpendicular to the longitudinal axis L
n Number of turns of the coil 35
1 Actuator, linear actuator
20 Stationary part of the actuator 1
22 Second ferromagnetic body of high permeability
23a, 23b Collar-like projections which are composed of ferromagnetic material of high permeability
25 Magnet
30 Part, which can oscillate, of the actuator 1
31 Actuator housing
32 First ferromagnetic body of high permeability
33a, 33b Collar-like projections which are composed of ferromagnetic material of high permeability
34 Opening in the actuator housing 31
35 Electrically conductive coil
4 Air gap
51a, 51b Spring-action elements, for example metal springs, for example diaphragm springs, helical springs or leaf springs
52 Elastomeric body
53 Sliding guide or ball guide
54 Supporting spring
60 Connecting element
61 Lateral projection of the connecting element 60
7 Structure into which an oscillation is intended to be introduced by the actuator, for example vehicle body

What is claimed is:
1. An actuator comprising:
an electrically conductive coil defining a longitudinal axis (L) and having a plurality (n) of winding turns configured to have an electrical current flow therethrough;
a first ferromagnetic body of high permeability surrounding said electrically conductive coil in such a manner that said first ferromagnetic body has collar-like projections of ferromagnetic material of high permeability above and below said electrically conductive coil in the direction of said longitudinal axis (L);
at least one magnet;
a second ferromagnetic body of high permeability surrounding said at least one magnet such that said second ferromagnetic body has collar-like projections of ferromagnetic material of high permeability above and below said at least one magnet in the direction of said longitudinal axis (L);
said at least one magnet being spaced substantially perpendicularly from said winding turns with respect to said longitudinal axis (L) and said collar-like projections of said first ferromagnetic body being spaced substantially perpendicularly from said collar-like projections of said second ferromagnetic body so as to cause said electrically conductive coil, said magnet, said collar-like projections of said first ferromagnetic body, and said collar-like projections of said second ferromagnetic body to conjointly define an air gap therebetween;
said air gap having a constant width;
said at least one magnet having a side facing away from said air gap;
said electrically conducting coil having a side facing away from said air gap;

said first ferromagnetic body being disposed on said side of said electrically conductive coil facing away from said air gap;

said second ferromagnetic body being disposed on said side of said magnet facing away from said air gap;

said at least one magnet being statically mounted together with said second ferromagnetic body;

said electrically conductive coil being spring mounted together with said first ferromagnetic body so as to enable said electrically conductive coil together with said first ferromagnetic body to oscillate in the direction of said longitudinal axis (L) when an alternating current is flowing through said electrically conductive coil; and, said electrically conductive coil being arranged outside of said magnet perpendicularly with respect to said longitudinal axis (L).

2. The actuator of claim 1, wherein:

said electrically conductive coil has ends; and, said at least one magnet projects beyond said ends of said coil as seen in the direction of the longitudinal axis (L) of said electrically conductive coil when the actuator is in a static state.

3. The actuator of claim 1, wherein:

said at least one magnet is configured as a cylindrical magnet; and, said electrically conductive coil is configured as a cylindrical coil disposed around said cylindrical magnet in a radial direction with respect to said longitudinal axis (L).

4. An actuator comprising:

an electrically conductive coil defining a longitudinal axis (L) and having a plurality (n) of winding turns configured to have an electrical current flow therethrough;

a first ferromagnetic body of high permeability surrounding said electrically conductive coil in such a manner that said first ferromagnetic body has collar-like projections of ferromagnetic material of high permeability above and below said electrically conductive coil in the direction of said longitudinal axis (L);

at least one magnet spaced substantially perpendicularly from said winding turns with respect to said longitudinal axis (L) so as to cause said coil and said at least one magnet to conjointly define an air gap therebetween;

a second ferromagnetic body of high permeability surrounding said magnet such that said second ferromagnetic body has collar-like projections of ferromagnetic material of high permeability above and below said at least one magnet in the direction of said longitudinal axis (L);

said at least one magnet having a side facing away from said air gap;

said electrically conducting coil having a side facing away from said air gap;

said first ferromagnetic body being disposed on said side of said electrically conductive coil facing away from said air gap;

said second ferromagnetic body being disposed on said side of said at least one magnet facing away from said air gap;

said at least one magnet being statically mounted together with said second ferromagnetic body;

said electrically conductive coil being spring mounted together with said first ferromagnetic body so as to enable said electrically conductive coil together with said first ferromagnetic body to oscillate in the direction of said longitudinal axis (L) when an alternating current is flowing through said electrically conductive coil;

said electrically conductive coil being arranged outside of said at least one magnet perpendicularly with respect to said longitudinal axis (L);

the actuator being configured to introduce oscillations to a structure;

an actuator housing surrounding said electrically conductive coil at least in regions thereof;

said actuator housing defining an opening;

a connecting element being disposed through said opening; and, said connecting element configured to connect one of said magnet and said second ferromagnetic body to the structure on an outer side of said actuator housing.

5. The actuator of claim 4, wherein said electrically conductive coil further defines a radial direction (R), the actuator further comprising:

at least one elastomeric body provided between said actuator housing and one of said connecting element and the structure so that said elastomeric body can absorb transverse forces in said radial direction (R) and have a damping effect in the direction of said longitudinal axis (L) when said electrically conductive coil is oscillating.

6. The actuator of claim 5, wherein:

said connecting element surrounds said actuator housing at least in regions in the direction of said longitudinal axis (L); and, said elastomeric body is disposed between said connecting element and said actuator housing in said radial direction.

7. The actuator of claim 4 further comprising:

one of a ball guide and a sliding guide disposed between said connecting element and said actuator housing in the region of said opening in such a manner that said one of said ball guide and said sliding guide is configured to guide said electrically conductive coil in the direction of said longitudinal axis (L).

8. The actuator of claim 4, wherein said connecting element surrounds said actuator housing at least in regions, the actuator further comprising:

at least one ball guide disposed between said connecting element and said actuator housing in such a manner that said ball guide is configured to guide said electrically conductive coil in the direction of said longitudinal axis (L).

9. The actuator of claim 4, wherein said connecting element surrounds said actuator housing at least in regions, the actuator further comprising:

at least one sliding guide disposed between said connecting element and said actuator housing in such a manner that said sliding guide is configured to guide said electrically conductive coil in the direction of said longitudinal axis (L).

10. The actuator of claim 4 further comprising a supporting spring disposed between said actuator housing and the structure in such a manner that said supporting spring has a damping effect in the direction of said longitudinal axis (L) when said electrically conductive coil is oscillating.

* * * * *